(12) United States Patent
Khurana et al.

(10) Patent No.: US 11,949,967 B1
(45) Date of Patent: Apr. 2, 2024

(54) AUTOMATIC CONNOTATION FOR AUDIO AND VISUAL CONTENT USING IOT SENSORS

(71) Applicant: International Business Machines Corporation, Armonk, NY (US)

(72) Inventors: Dhruv Khurana, Sandy Springs, GA (US); Kristin E. McNeil, Charlotte, NC (US); Itai Gordon, Modiin (IL); Radha Mohan De, Howrah (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/935,947

(22) Filed: Sep. 28, 2022

(51) Int. Cl.
H04N 21/854 (2011.01)
H04N 21/442 (2011.01)
H04N 21/8541 (2011.01)

(52) U.S. Cl.
CPC ... *H04N 21/8541* (2013.01); *H04N 21/44218* (2013.01)

(58) Field of Classification Search
None
See application file for complete search history.

(56) References Cited

U.S. PATENT DOCUMENTS

| | | | | |
|---|---|---|---|---|
| 8,327,395 | B2* | 12/2012 | Lee | H04H 60/64 725/12 |
| 8,495,683 | B2* | 7/2013 | van Coppenolle | H04N 21/812 725/9 |
| 8,751,957 | B1* | 6/2014 | Trajkovic | H04N 21/4755 715/728 |
| 9,477,783 | B2* | 10/2016 | Barbieri | G06F 16/78 |
| 9,736,503 | B1* | 8/2017 | Bakshi | H04N 21/23424 |

(Continued)

FOREIGN PATENT DOCUMENTS

| | | |
|---|---|---|
| CN | 102346898 A | 2/2012 |
| CN | 106416233 A | 2/2017 |

(Continued)

OTHER PUBLICATIONS

Shu et al., "A Review of Emotion Recognition Using Physiological Signals", Sensors (Basel) vol. 18(7), Jul. 2018, 41 Pages.

(Continued)

*Primary Examiner* — An Son P Huynh
(74) *Attorney, Agent, or Firm* — Stephanie L. Carusillo

(57) ABSTRACT

In an approach for enhancing an experience of a user listening to and/or watching an audio-visual content by modifying future audio and/or video frames of the audio-visual content, a processor captures a set of sensor data from an IoT device worn by the first user. A processor analyzes the set of sensor data to generate one or more connotations by converting the emotion using an emotional vector analytics technique and a supervised machine learning technique. A processor scores the one or more connotations on a basis of similarity between the emotion exhibited by the first user and an emotion expected to be provoked by a second user. A processor determines whether a score of the one or more connotations exceeds a pre-configured threshold level. Responsive to determining the score does not exceed the pre-configured threshold level, a processor generates a suggestion for the producer of the audio-visual content.

17 Claims, 3 Drawing Sheets

(56) References Cited

U.S. PATENT DOCUMENTS

| | | | | |
|---|---|---|---|---|
| 10,187,694 | B2* | 1/2019 | Meredith | H04H 60/66 |
| 10,205,988 | B1* | 2/2019 | Waterman | H04N 21/8455 |
| 10,257,572 | B2* | 4/2019 | Manus | H04N 21/2407 |
| 10,481,749 | B1* | 11/2019 | Alfishawi | G06F 3/0481 |
| 10,637,872 | B2* | 4/2020 | Solow | H04N 21/25841 |
| 10,645,455 | B1* | 5/2020 | Glaeser | H04N 21/4666 |
| 10,769,677 | B1* | 9/2020 | Agrawal | G06F 16/9535 |
| 11,265,602 | B2* | 3/2022 | Malhotra | H04N 21/44204 |
| 11,321,386 | B2* | 5/2022 | McCarty | G06F 16/632 |
| 11,601,721 | B2* | 3/2023 | Bloch | H04N 21/8541 |
| 2003/0066067 | A1* | 4/2003 | Gutta | G06F 16/9535 |
| | | | | 707/E17.109 |
| 2012/0072936 | A1 | 3/2012 | Small | |
| 2012/0278331 | A1* | 11/2012 | Campbell | H04N 21/44204 |
| | | | | 707/E17.09 |
| 2013/0091515 | A1* | 4/2013 | Sakata | H04N 17/04 |
| | | | | 725/10 |
| 2013/0145385 | A1* | 6/2013 | Aghajanyan | H04N 21/4667 |
| | | | | 725/10 |
| 2013/0205314 | A1* | 8/2013 | Ramaswamy | H04N 21/42201 |
| | | | | 725/14 |
| 2013/0298147 | A1 | 11/2013 | Klein | |
| 2014/0089017 | A1* | 3/2014 | Klappert | G06Q 10/02 |
| | | | | 705/5 |
| 2014/0137144 | A1 | 5/2014 | Järvenpää | |
| 2015/0033266 | A1* | 1/2015 | Klappert | H04N 21/4314 |
| | | | | 725/52 |
| 2015/0178511 | A1* | 6/2015 | Klappert | G06F 21/6245 |
| | | | | 726/27 |
| 2015/0181291 | A1* | 6/2015 | Wheatley | H04N 21/84 |
| | | | | 725/10 |
| 2015/0381932 | A1 | 12/2015 | Louchheim | |
| 2016/0063874 | A1 | 3/2016 | Czerwinski | |
| 2016/0088332 | A1* | 3/2016 | Lind | H04N 21/25891 |
| | | | | 725/14 |
| 2016/0199977 | A1 | 7/2016 | Breazeal | |
| 2016/0244011 | A1 | 8/2016 | Ricci | |
| 2016/0286244 | A1* | 9/2016 | Chang | H04N 21/4788 |
| 2016/0366203 | A1* | 12/2016 | Blong | H04L 65/612 |
| 2017/0032396 | A1* | 2/2017 | Gupta | H04L 67/5651 |
| 2017/0054779 | A1* | 2/2017 | Ehmann | G06F 16/433 |
| 2017/0061528 | A1* | 3/2017 | Arora | G06F 16/951 |
| 2018/0098133 | A1* | 4/2018 | Liassides | H04N 21/44204 |
| 2018/0150882 | A1* | 5/2018 | Hu | G06Q 30/0269 |
| 2018/0181868 | A1* | 6/2018 | Chew | H04L 67/12 |
| 2018/0189282 | A1* | 7/2018 | Hartlaub | G06F 16/437 |
| 2018/0189866 | A1* | 7/2018 | Dhondse | G06Q 30/08 |
| 2018/0192000 | A1* | 7/2018 | Mercredi | G06Q 50/01 |
| 2018/0246570 | A1 | 8/2018 | Coleman | |
| 2018/0249215 | A1* | 8/2018 | Wilkinson | H04N 21/4223 |
| 2019/0026274 | A1* | 1/2019 | Deng | G06F 18/241 |
| 2019/0028766 | A1* | 1/2019 | Wold | G06Q 50/184 |
| 2019/0095961 | A1* | 3/2019 | Wu | G06Q 30/0255 |
| 2019/0132646 | A1 | 5/2019 | Bharti | |
| 2019/0268661 | A1* | 8/2019 | Park | H04N 21/4518 |
| 2019/0373330 | A1* | 12/2019 | Bloch | H04N 21/4532 |
| 2020/0074154 | A1* | 3/2020 | El Kaliouby | A61B 5/7267 |
| 2020/0142999 | A1* | 5/2020 | Pedersen | G06N 20/00 |
| 2020/0143000 | A1* | 5/2020 | Childs | G06F 16/248 |
| 2020/0160351 | A1* | 5/2020 | Veggalam | H04M 3/5175 |
| 2020/0349768 | A1* | 11/2020 | Zavesky | G06T 19/006 |
| 2020/0364588 | A1* | 11/2020 | Knox | G06V 40/20 |
| 2021/0064676 | A1* | 3/2021 | Rawal | G06V 30/274 |
| 2021/0203955 | A1 | 7/2021 | Coza | |
| 2021/0385515 | A1 | 12/2021 | Zavesky | |
| 2022/0036466 | A1* | 2/2022 | Harvey | H04L 67/306 |
| 2022/0174357 | A1* | 6/2022 | Zavesky | H04N 21/44213 |
| 2022/0207445 | A1* | 6/2022 | Sutton-Vermeulen | |
| | | | | G06Q 10/0639 |
| 2022/0351218 | A1* | 11/2022 | Karri | G06N 20/00 |
| 2023/0095350 | A1* | 3/2023 | Varan | H04N 21/44218 |
| | | | | 725/12 |

FOREIGN PATENT DOCUMENTS

| | | |
|---|---|---|
| CN | 113556603 A | 10/2021 |
| TW | 201911877 A | 3/2019 |

OTHER PUBLICATIONS

Wu et al., "The Internet of Things and interaction style: the effect of smart interaction on brand attachment", Journal of Marketing Management, ISSN: 0267-257X (Print), 1472-1376 (Online), Sep. 22, 2016, 16 Pages.

International Searching Authority, "Notification of Transmittal of the International Search Report and the Written Opinion of the International Searching Authority, or the Declaration," Applicant File Reference PF230546PCT, International Application No. PCT/CN2023/119374, International Filing Date 18 Sep. 18, 2023, dated Nov. 23, 2023, 9 pages.

* cited by examiner

US 11,949,967 B1

AUTOMATIC CONNOTATION FOR AUDIO AND VISUAL CONTENT USING IOT SENSORS

BACKGROUND OF THE INVENTION

The present invention relates generally to the field of data processing, and more particularly to an automatic connotation for audio and visual content using IoT sensors.

Audio and visual content consists of and/or possesses any combination of audio and visual components that are intended to inform, enlighten, or entertain, irrespective of its duration, initial intended use, or manner of distribution. Examples of audio and visual content include films, television series, online streaming videos, video games, music albums, music songs, podcasts, webinars, slides, lecture notes, artwork, infographics, and photographs and images.

The Internet of Things (IoT) is the inter-networking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

SUMMARY

Aspects of an embodiment of the present invention disclose a method, computer program product, and computer system for enhancing an experience of a user listening to and/or watching an audio-visual content by modifying future audio and/or video frames of the audio-visual content. Responsive to a first user exhibiting an emotion to an audio-visual content, a processor captures a set of sensor data from an IoT device worn by the first user. A processor analyzes the set of sensor data to generate one or more connotations by converting the emotion using an emotional vector analytics technique and a supervised machine learning technique. A processor scores the one or more connotations on a basis of similarity between the emotion exhibited by the first user and an emotion expected to be provoked by a producer of the audio-visual content using an analytical process. A processor determines whether a score of the one or more connotations exceeds a pre-configured threshold level. Responsive to determining the score does not exceed the pre-configured threshold level, a processor generates a suggestion for the producer of the audio-visual content.

In some aspects of an embodiment of the present invention, the first user is an observer of the audio-visual content, and wherein the audio-visual content includes at least one of a film, a television series, a commercial, an online streaming video, a video game, a music album, a music song, a podcast, a webinar, a slide, a lecture note, an artwork, an infographic, a photograph, and an image.

In some aspects of an embodiment of the present invention, the set of sensor data from the IoT device worn by the first user includes at least one of a heart rate of the first user, a pulse of the first user, a respiratory rate of the first user, a change in the nervous system of the first user, a set of neurological data of the first user, and a movement made by the first user.

In some aspects of an embodiment of the present invention, a processor identifies a first set of video frames of the audio-visual content the first user was watching when the first user exhibited the emotion.

In some aspects of an embodiment of the present invention, the first set of video frames extend a span of time, and wherein the span of time begins when the first user started exhibiting the emotion and ends when the first user stopped exhibiting the emotion.

In some aspects of an embodiment of the present invention, a processor compares the set of sensor data to a set of historical data stored in a database to identify the emotion exhibited by one or more previous users. A processor classifies the set of sensor data as an emotion based on a result of the comparison using an emotional learning model.

In some aspects of an embodiment of the present invention, a processor compares the score given to the one or more connotations to a historical data model, wherein the historical data model includes a mapping of one or more emotions previously exhibited by one or more previous observers of the audio-visual content.

In some aspects of an embodiment of the present invention, the suggestion includes a set of feedback on how to modify a second set of video frames to more closely match the emotion expected to be provoked by the producer of the audio-visual content, and wherein the second set of video frames extend an upcoming span of time.

In some aspects of an embodiment of the present invention, subsequent to generating the suggestion for the producer of the audio-visual content, a processor enables the producer of the audio-visual content to modify the second set of video frames to more closely match the emotion expected to be provoked by the producer of the audio-visual content.

These and other features and advantages of the present invention will be described in, or will become apparent to those of ordinary skill in the art in view of, the following detailed description of the example embodiments of the present invention.

DETAILED DESCRIPTION

Figure 1:
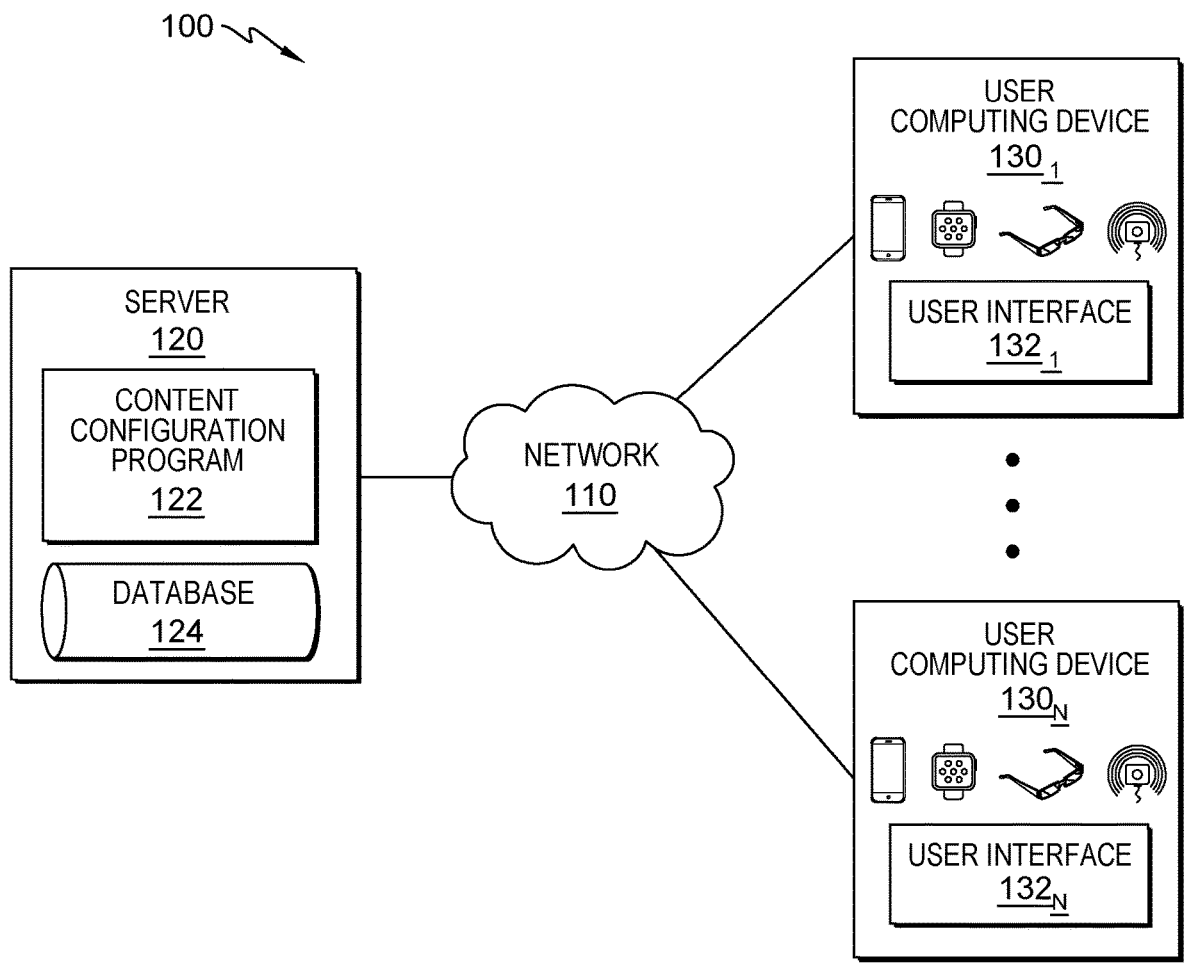
FIG. 1 is a functional block diagram illustrating a distributed data processing environment, in accordance with an embodiment of the present invention.

Embodiments of the present invention recognize that an emotion refers to a mental state and/or an emotional state that arises spontaneously rather than through conscious effort. An emotion arises spontaneously because of neurophysiological changes, associated with thoughts, feelings, behavioral responses, and a degree of pleasure or displeasure. An emotion is often accompanied by physical and physiological changes that are relevant to the human organs and tissues such as the brain, heart, skin, blood flow, muscle, facial expressions, and voice.

Embodiments of the present invention recognize that, in response to listening and/or watching audio and visual content (hereinafter referred to as "audio-visual content"), a user may provide feedback through reactions, comments, shares, impressions, and clicks. Audio-visual content consists of and/or possesses any combination of audio and visual components that are intended to inform, enlighten, or entertain, irrespective of its duration, initial intended use, or manner of distribution. Examples of audio-visual content include films, television series, online streaming videos, video games, music albums, music songs, podcasts, webinars, slides, lecture notes, artwork, infographics, and photographs and images. Embodiments of the present invention recognize that a mental state and/or an emotional state of the user may be determined from the feedback provided by the user. Currently, however, the feedback provided by the user is a summary of the user's impressions about the audio-visual content.

Embodiments of the present invention recognize that audio-visual content may contain multiple parts, wherein each part invokes a different mental state and/or emotional state of the user. Embodiments of the present invention further recognize that emotions may identified by an emotion recognition method. Emotion recognition methods can be classified into two major categories. One category is using human physical signals such as facial expression, speech, gesture, and posture. The other category is using internal signals such as the physiological signs, which include, but are not limited to, an electroencephalogram, a temperature, an electrocardiogram, an electromyogram, a galvanic skin response, and a respiration rate.

Therefore, embodiments of the present invention recognize the need for a system and method to capture an expression of an emotion of a user to audio-visual content in real-time, to convert the emotion of the user to a suggested connotation, and to generate a report with one or more suggestions for the producer of the audio-visual content to improve a future version of the audio-visual content.

Embodiments of the present invention provide a system and method to enhance a user's experience while listening to and/or watching an audio-visual content by modifying future audio and/or video frames of the audio-visual content based on one or more emotions exhibited by the user. Responsive to a first user exhibiting an emotion to an audio-visual content, embodiments of the present invention capture a set of sensor data from an IoT device worn by the first user. Embodiments of the present invention connect the feedback capture system to the IoT device worn by the first user through a cloud service. Embodiments of the present invention classify the set of sensor data captured as an emotion using an emotional learning model. Embodiments of the present invention connotates the emotion using an emotional vector analytics technique and a supervised machine learning model to attach the connotations on a frame-by-frame basis. Embodiments of the present invention scores the connotations on a basis of similarity between the emotion exhibited by the first user and an emotion expected to be provoked by a producer of the audio-visual content using an analytical process. Embodiments of the present invention generate a qualitative report with one or more suggestions the producer may make to a second set of video frames so that the second set of video frames more closely matches the emotion expected to be provoked by the producer. Embodiments of the present invention may intelligently generate a second set of video frames with the producer's consent or may enable the producer to manually generate the second set of video frames.

Implementation of embodiments of the present invention may take a variety of forms, and exemplary implementation details are discussed subsequently with reference to the Figures.

FIG. 1 is a block diagram illustrating a distributed data processing environment, generally designated 100, in accordance with an embodiment of the present invention. In the depicted embodiment, distributed data processing environment 100 includes server 120 and user computing devices $130_{1-N}$, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing devices $130_{1-N}$, and other computing devices (not shown) within distributed data processing environment 100.

Server 120 operates to run content configuration program 122 and to send and/or store data in database 124. In an embodiment, server 120 can send data from database 124 to user computing devices $130_{1-N}$. In an embodiment, server 120 can receive data in database 124 from user computing devices $130_{1-N}$. In one or more embodiments, server 120 can be a standalone computing device, a management server, a web server, a mobile computing device, or any other electronic device or computing system capable of receiving, sending, and processing data and capable of communicating with user computing devices $130_{1-N}$ via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing devices $130_{1-N}$ and other computing devices (not shown) within distributed data processing environment 100 via network 110. Server 120 may include internal and external hardware components, as depicted and described in further detail in FIG. 2.

Content configuration program 122 operates to enhance a user's experience while listening to and/or watching an audio-visual content by modifying future audio and/or video frames of the audio-visual content based on one or more emotions exhibited by the user. In the depicted embodiment, content configuration program 122 is a standalone program. In another embodiment, content configuration program 122 may be integrated into another software product, such as an audio or video editing software. In the depicted embodiment, content configuration program 122 resides on server 120. In another embodiment, content configuration program 122 may reside on user computing devices $130_{1-N}$ or on another computing device (not shown), provided that content configuration program 122 has access to network 110.

In an embodiment, the user of user computing devices $130_{1-N}$ registers with content configuration program 122 of server 120. For example, the user completes a registration process (e.g., user validation), provides information to create a user profile, and authorizes the collection, analysis, and distribution (i.e., opts-in) of relevant data on identified computing devices (e.g., on user computing devices $130_{1-N}$) by server 120 (e.g., via content configuration program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124. The operational steps of content configuration program 122 are depicted and described in further detail with respect to FIG. 2.

Database 124 operates as a repository for data received, used, and/or generated by content configuration program 122. A database is an organized collection of data. Data includes, but is not limited to, information about user preferences (e.g., general user system settings such as alert notifications for user computing devices $130_{1-N}$); information about alert notification preferences; a set of sensor data captured from a first user; a set of historical data including emotions exhibited by previous users of content configuration program 122; a historical data model; one or more suggestions generated; and any other data received, used, and/or generated by content configuration program 122.

Database 124 can be implemented with any type of device capable of storing data and configuration files that can be accessed and utilized by server 120, such as a hard disk drive, a database server, or a flash memory. In an embodiment, database 124 is accessed by content configuration program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that content configuration program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Content configuration program 122 enables the authorized and secure processing of personal data.

Content configuration program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Content configuration program 122 provides information regarding personal and/or confidential data and the nature (e.g., type, scope, purpose, duration, etc.) of the processing. Content configuration program 122 provides the user with copies of stored personal and/or confidential company data. Content configuration program 122 allows the correction or completion of incorrect or incomplete personal and/or confidential data. Content configuration program 122 allows for the immediate deletion of personal and/or confidential data.

User computing devices $130_{1-N}$ each operate to run user interface $132_{1-N}$, respectively, through which a user can interact with content configuration program 122 on server 120. As used herein, N represents a positive integer, and accordingly the number of scenarios implemented in a given embodiment of the present invention is not limited to those depicted in FIG. 1. In an embodiment, user computing devices $130_{1-N}$ are each a device that performs programmable instructions. For example, user computing devices $130_{1-N}$ may each be an electronic device, such as a laptop computer, a tablet computer, a netbook computer, a personal computer, a desktop computer, a smart phone, or any programmable electronic device capable of running the respective user interface $132_{1-N}$ and of communicating (i.e., sending and receiving data) with content configuration program 122 via network 110. In general, user computing devices $130_{1-N}$ represent any programmable electronic device or a combination of programmable electronic devices capable of executing machine readable program instructions and communicating with other computing devices (not shown) within distributed data processing environment 100 via network 110. In some embodiments, user computing devices $130_{1-N}$ may include more than one user computing device, such as a wearable computing device. A wearable computing device, also referred to as a "wearable," is a category of smart electronic devices that can detect, analyze, and transmit information concerning the wearer's body (e.g., vital signs and ambient data) and, in some cases, allow immediate biofeedback to the wearer. A wearable computing device can be worn as an accessory, embedded in a clothing item, implanted in a body, or even tattooed on the skin. A wearable computing device is a hands-free device with practical uses, powered by microprocessors and enhanced with the ability to send and receive data via the internet. For example, a wearable may include, but is not limited to, a smart watch, a smart glass, a smart ring, and other similar wearable computing devices. In the depicted embodiment, user computing devices $130_{1-N}$ each include a respective instance of user interfaces $132_{1-N}$.

User interface 132$_{1-N}$ operates as a local user interface between content configuration program 122 on server 120 and a user of user computing devices 130$_{1-N}$. In some embodiments, user interface 132$_{1-N}$ is a graphical user interface (GUI), a web user interface (WUI), and/or a voice user interface (VUI) that can display (i.e., visually) or present (i.e., audibly) text, documents, web browser windows, user options, application interfaces, and instructions for operations sent from content configuration program 122 to a user via network 110. User interface 132$_{1-N}$ can also display or present alerts including information (such as graphics, text, and/or sound) sent from content configuration program 122 to a user via network 110. In an embodiment, user interface 132$_{1-N}$ is capable of sending and receiving data (i.e., to and from content configuration program 122 via network 110, respectively). Through user interface 132$_{1-N}$, a user can opt-in to content configuration program 122; create a user profile; set user preferences and alert notification preferences; receive one or more suggestions generated; receive a request for feedback; and input feedback.

A user preference is a setting that can be customized for a particular user. A set of default user preferences are assigned to each user of content configuration program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of content configuration program 122.

Figure 2:
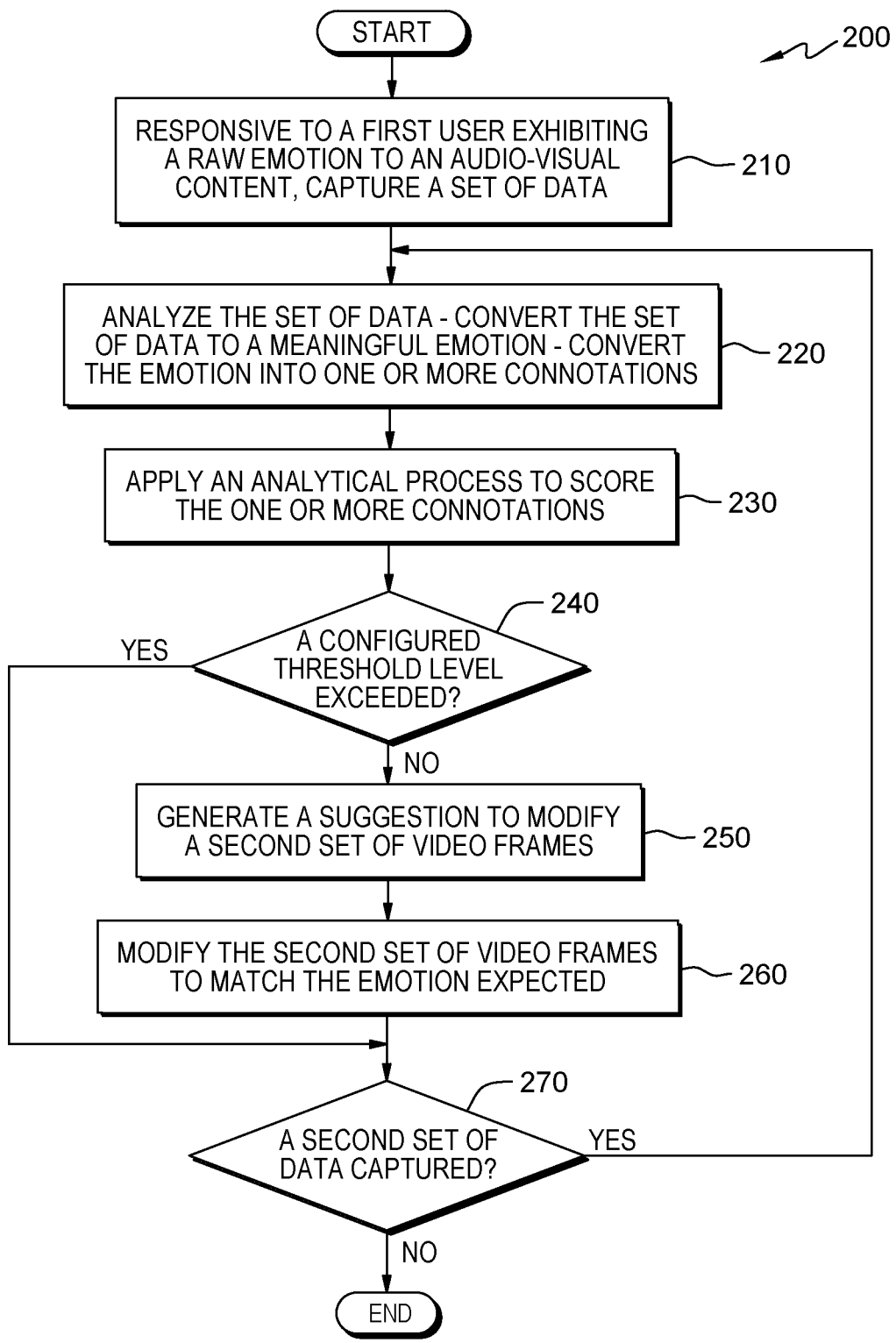
FIG. 2 is a flowchart illustrating the operational steps of a content configuration program, on a server within the distributed data processing environment of FIG. 1, in accordance with an embodiment of the present invention.

FIG. 2 is a flowchart, generally designated 200, illustrating the operational steps for content configuration program 122, on server 120 within distributed data processing environment 100 of FIG. 1, in accordance with an embodiment of the present invention. In an embodiment, content configuration program 122 operates to enhance an experience of a user while listening to and/or watching an audio-visual content by modifying future audio and/or video frames of the audio-visual content based on one or more emotions exhibited by the user. It should be appreciated that the process depicted in FIG. 2 illustrates one possible iteration of the process flow, which may be repeated for each emotion exhibited by the user to an audio-visual content.

In step 210, responsive to a first user exhibiting an emotion in reaction to an audio-visual content the first user is listening to and/or watching, content configuration program 122 captures a set of sensor data. In another embodiment, responsive to two or more first users exhibiting an emotion in reaction to an audio-visual content the two or more first users are listening to and/or watching, content configuration program 122 captures a set of sensor data. The first user may be, but is not limited to, listening to and/or watching a film (i.e., a movie), a television series, a commercial, an online streaming video, a video game, a music album, a music song, a podcast, a webinar, a slide, a lecture note, an artwork, an infographic, a photograph, and an image. The first user is wearing an IoT wearable device on the first user's body (i.e., user computing devices 130$_{1-N}$). The IoT wearable device may include, but is not limited to, a smart watch, a smart glass, a smart ring, and other similar devices. In an embodiment, content configuration program 122 captures a set of sensor data from an IoT wearable device on the first user's body (i.e., user computing devices 130$_{1-N}$). The set of sensor data captured from the first user may include, but is not limited to, a heart rate of the first user, a pulse of the first user, a respiratory rate of the first user, a change in the nervous system of the first user, a set of neurological data of the first user, and a movement made by the first user.

In an embodiment, content configuration program 122 identifies a first set of video frames of the audio-visual content the first user was listening to and/or watching when the first user exhibited the emotion. The first set of video frames extend a span of time. The span of time begins when the first user started exhibiting the emotion and ends when the first user stopped exhibiting the emotion as determined by the set of sensor data captured from the IoT wearable device on the first user's body (i.e., user computing devices 130$_{1-N}$).

In step 220, content configuration program 122 analyzes the set of sensor data to generate one or more connotations. In an embodiment, content configuration program 122 compares the set of sensor data (e.g., the heart rate of the first user, the pulse of the first user, the respiratory rate of the first user, the change in the nervous system of the first user, the set of neurological data of the first user, and the movement of the first user) to a set of historical data stored in a database (e.g., database 124) to identify an emotion exhibited by previous users of content configuration program 122 (i.e., with a similar set of sensor data). In an embodiment, content configuration program 122 classifies the set of sensor data as an emotion (i.e., the emotion exhibited by the first user) based on a result of the comparison with the historical data using an emotional learning model. In an embodiment, content configuration program 122 converts the emotion into one or more connotations using an Emotional Vector Analytics method. In an embodiment, content configuration program 122 converts the emotion into one or more connotations using a supervised machine learning technique.

In an embodiment, when two or more first users are listening to and/or watching the audio-visual content, content configuration program 122 performs this process (i.e., steps 210 and 220) for each user listening to and/or watching the audio-visual content simultaneously. In an embodiment, content configuration program 122 compiles the sets of data captured in a table format.

In step 230, content configuration program 122 applies an analytical process to score the one or more connotations. In an embodiment, content configuration program 122 scores the one or more connotations on a scale of 0 to 100. In an embodiment, content configuration program 122 scores the one or more connotations on a basis of similarity (i.e., a comparison) between the emotion exhibited by the first user and an emotion that a second user expected to be provoked by the audio-visual content. The second user is a producer of the audio-visual content. In an embodiment, content configuration program 122 generates a score for the first user listening to and/or watching the audio-visual content. If the emotion exhibited by the first user is similar to the emotion expected to be provoked by the second user, then the score generated will be on the higher end of the scale. If the emotion exhibited by the first user is dissimilar to the emotion expected to be provoked by the second user, then the score generated will be on the lower end of the scale.

In another embodiment, when two or more first users are listening to and/or watching the audio-visual content, content configuration program 122 generates an overall score for the two or more users listening and/or watching the audio-visual content simultaneously. In an embodiment, content configuration program 122 reconciles the feedback from the two or more users listening and/or watching the audio-visual content simultaneously using a median emotional feedback method. For example, ten audience members are watching a movie. Five audience members like a scene of the movie and are generally happy watching the scene of the movie. The happy emotion corresponds with a score of 10 on a scale of 1 to 10. Five audience members, however, do not like the scene of the movie and are generally unhappy watching the scene of the movie. The unhappy emotion corresponds with a score of 5 on the scale of 1 to 10. Content configuration program 122 uses the median emotional feedback method and determines the median emotional score is 7.5. Content configuration program 122 uses the median emotional score to determine mass audience feedback. In another embodiment, content configuration program 122 reconciles the feedback from the two or more users listening and/or watching the audio-visual content simultaneously using a mode emotional feedback method. For example, ten audience members are watching a movie. Seven audience members like a scene of the movie, but three audience members do not like the scene of the movie. Content configuration program 122 uses the mode emotional feedback method and determines the feedback of the majority of the audience members takes precedence when determining mass audience feedback.

In decision step 240, content configuration program 122 determines whether the score of the one or more connotations exceeds a pre-configured threshold level. In an embodiment, content configuration program 122 determines whether the score of the one or more connotations exceeds a pre-configured threshold level by ten points (i.e., +10) or does not exceed a pre-configured threshold level by ten points (i.e., −10). In another embodiment, when two or more first users are listening to and/or watching the audio-visual content, content configuration program 122 determines whether the overall score of the one or more connotations exceeds a pre-configured threshold level. In another embodiment, content configuration program 122 determines whether the overall score of the one or more connotations exceeds a pre-configured threshold level by ten points (i.e., +10) or does not exceed a pre-configured threshold level by ten points (i.e., −10). In an embodiment, content configuration program 122 compares the overall score to a historical data model stored in the database (e.g., database 124). The historical data model includes a mapping of the emotions previously exhibited by other users with a similar set of sensor data. If content configuration program 122 determines the score of the one or more connotations does not exceed the pre-configured threshold level (i.e., the emotion exhibited by the first user is dissimilar to the emotion expected to be provoked by the second user and the score generated is on the lower end of the scale) (decision step 240, YES branch), then content configuration program 122 proceeds to step 250, generating a first suggestion. If content configuration program 122 determines the score of the one or more connotations exceeds the pre-configured threshold level (i.e., the emotion exhibited by the first user is similar to the emotion expected to be provoked by the second user and the score generated is on the higher end of the scale) (decision step 240, NO branch), then content configuration program 122 enables the audio-visual content to continue to play.

In step 250, content configuration program 122 generates a first suggestion. The first suggestion recommends one or more changes the second user may make to a second set of video frames to more closely match the emotion expected to be provoked by the second user. The second set of video frames extend an upcoming span of time. In an embodiment, content configuration program 122 outputs the first suggestion to the second user. In an embodiment, content configuration program 122 outputs the first suggestion to the second user through a second user interface (i.e., user interface $132_{1-N}$). of a second user computing device (i.e., user computing devices $130_{1-N}$).

In step 260, content configuration program 122 modifies the second set of video frames to more closely match the emotion expected to be provoked by the second user. In another embodiment, content configuration program 122 enables the second user to modify the second set of video frames to more closely match the emotion expected to be provoked by the second user. In an embodiment, content configuration program 122 enables the second user to modify the second set of video frames to remove other stored versions of frames similar to the first set of frames. Modifying may include, but is not limited to, adding, removing, and changing the second set of video frames.

In an embodiment, content configuration program 122 generates a second suggestion. The second suggestion recommends the second user store a plurality of copies of the second set of frames in a single content pack. In an embodiment, content configuration program 122 enables the second user to select a copy of the second set of frames based on the emotion exhibited by the first user to the first set of frames.

In decision step 270, content configuration program 122 enables the audio-visual content to continue to play. In an embodiment, responsive to determining the score of the one or more connotations exceeds the pre-configured threshold level (i.e., the emotion exhibited by the first user is similar to the emotion expected to be provoked by the second user and the score generated is on the higher end of the scale) (decision step 240, NO branch), then content configuration program 122 enables the audio-visual content to continue to play unmodified. In an embodiment, responsive to modifying the second set of video frames to more closely match the emotion expected to be provoked by the second user (step 260), then content configuration program 122 enables the audio-visual content to continue to play modified.

In an embodiment, content configuration program 122 continues to monitor for sensor data captured from the first user through user computing devices $130_{1-N}$ until the audio-visual content finishes. In an embodiment, content configuration program 122 determines whether a second set of data has been captured from the first user through user computing devices $130_{1-N}$. If content configuration program 122 determines a second set of data has been captured from the first user through user computing devices $130_{1-N}$ (decision step 270, YES branch), then content configuration program 122 returns to step 220, analyzing the set of data. If content configuration program 122 determines a second set of data has not been captured from the first user through user computing devices $130_{1-N}$ (decision step 270, NO branch), then content configuration program 122 continues to monitor for data from the first user captured through user computing devices $130_{1-N}$ until the audio-visual content finishes.

For example, the first user is watching a documentary about penguins. The documentary was produced by the second user. Responsive to the first user exhibiting an emotion to the documentary, content configuration program 122 captures a set of sensor data from an IoT wearable device worn by the first user (i.e., user computing devices $130_{1-N}$). Content configuration program 122 also captures a first set of video frames of the documentary that were playing when the first user exhibited the emotion. The first user exhibited an emotion to the documentary when the first set of video frames showed a penguin's death. This caused the first user to be upset. However, the second user did not intend to cause the first user to be upset. Instead, the second user intended to inform the first user of the happenings during the life of the penguin. It would be a poor choice for the second user to show a clip of another penguin's death. Rather, the second user should show an alternative clip, such as a clip of a baby penguin learning how to swim or a clip of a group of penguins dancing. These alternative clips would elevate the mood of the first user and thus retain the attention of the first user. Content configuration program 122 generates a suggestion, recommending the second user modify a second set of video frames to more closely match the emotion expected to be provoked by the second user or to entirely change the second set of video frames.

Figure 3:
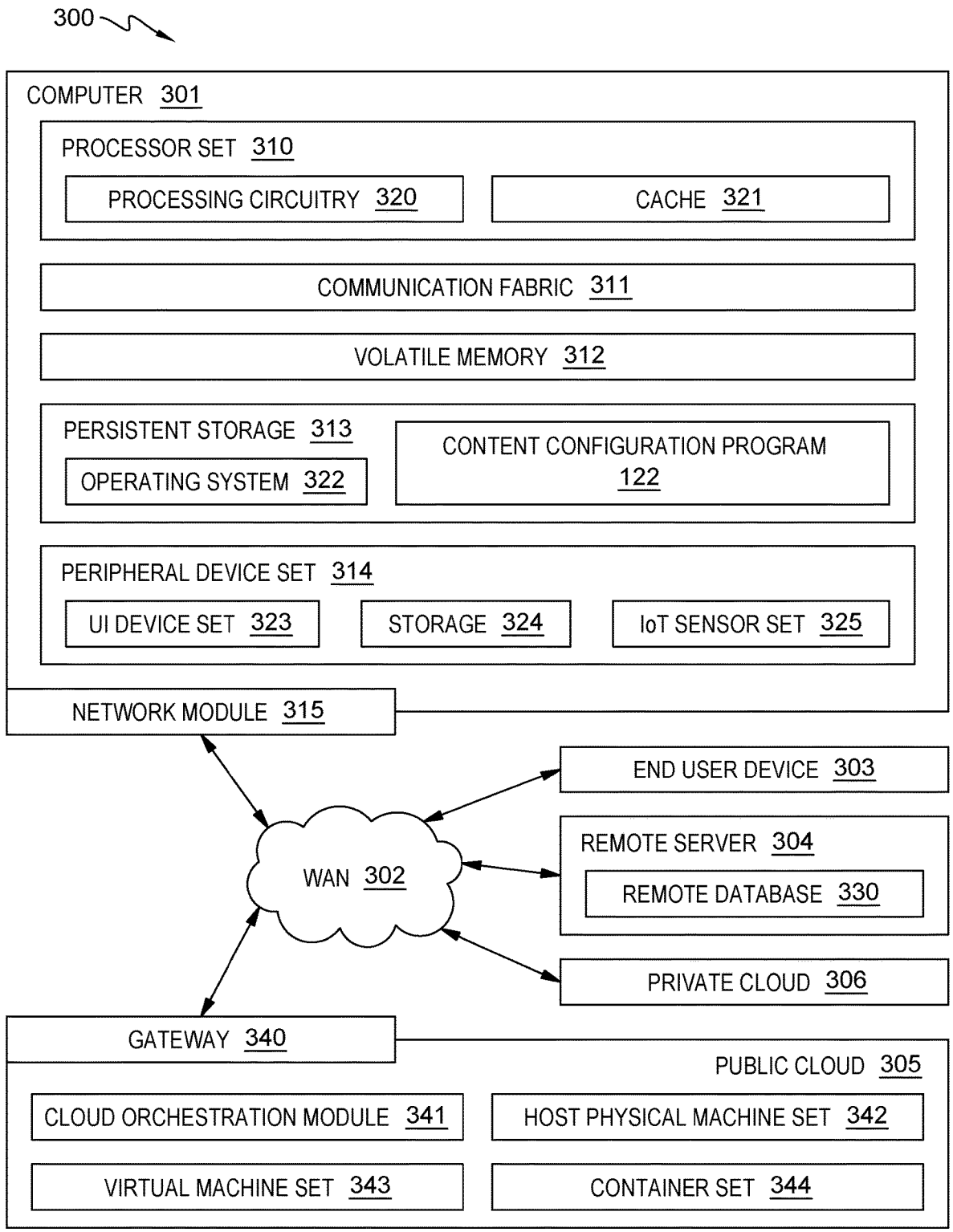
FIG. 3 depicts a block diagram of components of a computing environment representing the distributed data processing environment of FIG. 1, in accordance with an embodiment of the present invention.

FIG. 3 depicts a block diagram of components of server 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as content configuration program 122 for mixed reality scenario generation for cross industry training. In addition to content configuration program 122, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and content configuration program 122, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in content configuration program 122 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in content configuration program 122 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC)

connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network.

A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to a first user exhibiting an emotion to an audio-visual content, capturing, by one or more processors, a set of sensor data from an IoT device worn by the first user to identify a first set of video frames of the audio-visual content the first user was watching when the first user exhibited the emotion;
converting, by the one or more processors, the emotion exhibited by the first user to the audio-visual content captured in the set of sensor data into one or more connotations using an emotional vector analytics technique and a supervised machine learning technique to attach the one or more connotations on a frame-by-frame basis;
generating, by the one or more processors, a score for the one or more connotations on a basis of similarity between the emotion exhibited by the first user and an emotion expected to be provoked by a producer of the audio-visual content using an analytical process;
determining, by the one or more processors, whether the score of the one or more connotations exceeds a pre-configured threshold level, wherein exceeding the pre-configured threshold level indicates that the emotion exhibited by the first user is similar to the emotion expected to be provoked by the producer and not exceeding the pre-configured threshold level indicates that the emotion exhibited by the first user is dissimilar to the emotion expected to be provoked by the producer; and
responsive to determining the score does not exceed the pre-configured threshold level, modifying, by the one or more processors, a second set of video frames based on the emotion expected to be exhibited by a second user.

2. The computer-implemented method of claim 1, wherein the first user is an observer of the audio-visual content, and wherein the audio-visual content includes at least one of a film, a television series, a commercial, an online streaming video, a video game, a music album, a music song, a podcast, a webinar, a slide, a lecture note, an artwork, an infographic, a photograph, and an image.

3. The computer-implemented method of claim 1, wherein the set of sensor data from the IoT device worn by the first user includes at least one of a heart rate of the first user, a pulse of the first user, a respiratory rate of the first user, a change in the nervous system of the first user, a set of neurological data of the first user, and a movement made by the first user.

4. The computer-implemented method of claim 1, wherein the first set of video frames extend a span of time, and wherein the span of time begins when the first user started exhibiting the emotion and ends when the first user stopped exhibiting the emotion.

5. The computer-implemented method of claim 1, wherein converting the emotion exhibited by the first user to the audio-visual content captured in the set of sensor data into the one or more connotations using the emotional vector analytics technique and the supervised machine learning technique to attach the one or more connotations on the frame-by-frame basis further comprises:

comparing, by the one or more processors, the set of sensor data to a set of historical data stored in a database to identify the emotion exhibited by one or more previous users; and classifying, by the one or more processors, the set of sensor data as an emotion based on a result of the comparison using an emotional learning model.

6. The computer-implemented method of claim 1, wherein determining whether the score of the one or more connotations exceeds the pre-configured threshold level further comprises: comparing, by the one or more processors, the score given to the one or more connotations to a historical data model, wherein the historical data model includes a mapping of one or more emotions previously exhibited by one or more previous observers of the audio-visual content.

7. The computer-implemented method of claim 1, further comprising:

responsive to determining the score does not exceed the pre-configured threshold level, generating, by the one or more processors, a suggestion for a producer of the audio-visual content; and enabling, by the one or more processors, the producer of the audio-visual content to modify the second set of video frames based on the emotion expected to be provoked by the audio-visual content.

8. The computer-implemented method of claim 7, wherein the suggestion includes a set of feedback on how to modify the second set of video frames to more closely match the emotion expected to be provoked by the producer of the audio-visual content, and wherein the second set of video frames extend an upcoming span of time.

9. A computer program product comprising: one or more computer readable storage media and program instructions stored on the one or more computer readable storage media, the program instructions comprising:

responsive to a first user exhibiting an emotion to an audio-visual content, program instructions to capture a set of sensor data from an IoT device worn by the first user to identify a first set of video frames of the audio-visual content the first user was watching when the first user exhibited the emotion;

program instructions to convert the emotion exhibited by the first user to the audio-visual content captured in the set of sensor data into one or more connotations using an emotional vector analytics technique and a supervised machine learning technique to attach the one or more connotations on a frame-by-frame basis;

program instructions to generate a score for the one or more connotations on a basis of similarity between the emotion exhibited by the first user and an emotion expected to be provoked by a producer of the audio-visual content using an analytical process;

program instructions to determine whether the score of the one or more connotations exceeds a pre-configured threshold level, wherein exceeding the pre-configured threshold level indicates that the emotion exhibited by the first user is similar to the emotion expected to be provoked by the producer and not exceeding the pre-configured threshold level indicates that the emotion exhibited by the first user is dissimilar to the emotion expected to be provoked by the producer; and responsive to determining the score does not exceed the pre-configured threshold level, program instructions to modify a second set of video frames based on the emotion expected to be exhibited by a second user.

10. The computer program product of claim 9, wherein converting the emotion exhibited by the first user to the audio-visual content captured in the set of sensor data into the one or more connotations using the emotional vector analytics technique and the supervised machine learning technique to attach the one or more connotations on the frame-by-frame basis further comprises:

program instructions to compare the set of sensor data to a set of historical data stored in a database to identify the emotion exhibited by one or more previous users; and program instructions to classify the set of sensor data as an emotion based on a result of the comparison using an emotional learning model.

11. The computer program product of claim 9, wherein determining whether the score of the one or more connotations exceeds the pre-configured threshold level further comprises: program instructions to compare the score given to the one or more connotations to a historical data model, wherein the historical data model includes a mapping of one or more emotions previously exhibited by one or more previous observers of the audio-visual content.

12. The computer program product of claim 9, further comprising:

responsive to determining the score does not exceed the pre-configured threshold level, program instructions to generate the suggestion for the producer of the audio-visual content; and program instructions to enable the producer of the audio-visual content to modify the second set of video frames based on the emotion expected to be provoked by the audio-visual content.

13. The computer program product of claim 12, wherein the suggestion includes a set of feedback on how to modify the second set of video frames to more closely match the emotion expected to be provoked by the producer of the audio-visual content, and wherein the second set of video frames extend an upcoming span of time.

14. A computer system comprising:

one or more computer processors;

one or more computer readable storage media;

program instructions collectively stored on the one or more computer readable storage media for execution by at least one of the one or more computer processors, the stored program instructions comprising:

responsive to a first user exhibiting an emotion to an audio-visual content, program instructions to capture a set of sensor data from an IoT device worn by the first user to identify a first set of video frames of the audio-visual content the first user was watching when the first user exhibited the emotion;

program instructions to convert the emotion exhibited by the first user to the audio-visual content captured in the set of sensor data into one or more connotations using an emotional vector analytics technique and a supervised machine learning technique to attach the one or more connotations on a frame-by-frame basis;

program instructions to generate a score for the one or more connotations on a basis of similarity between the emotion exhibited by the first user and an emotion expected to be provoked by a producer of the audio-visual content using an analytical process;

program instructions to determine whether the score of the one or more connotations exceeds a pre-configured threshold level, wherein exceeding the pre-configured threshold level indicates that the emotion exhibited by the first user is similar to the emotion expected to be provoked by the producer and not exceeding the pre-configured threshold level indicates that the emotion exhibited by the first user is dissimilar to the emotion expected to be provoked by the producer; and responsive to determining the score does not exceed the pre-configured threshold level, program instructions to modify a second set of video frames based on the emotion expected to be exhibited by a second user.

15. The computer system of claim 14, wherein converting the emotion exhibited by the first user to the audio-visual content captured in the set of sensor data into the one or more connotations using the emotional vector analytics technique and the supervised machine learning technique to attach the one or more connotations on the frame-by-frame basis further comprises:

program instructions to compare the set of sensor data to a set of historical data stored in a database to identify the emotion exhibited by one or more previous users; and program instructions to classify the set of sensor data as an emotion based on a result of the comparison using an emotional learning model.

16. The computer system of claim 14, wherein determining whether the score of the one or more connotations exceeds the pre-configured threshold level further comprises: program instructions to compare the score given to the one or more connotations to a historical data model, wherein the historical data model includes a mapping of one or more emotions previously exhibited by one or more previous observers of the audio-visual content.

17. The computer system of claim 14, further comprising: responsive to determining the score does not exceed the pre-configured threshold level, program instructions to generate a suggestion for a producer of the audio-visual content; and program instructions to enable the producer of the audio-visual content to modify the second set of video frames based on the emotion expected to be provoked by the audio-visual content.

\* \* \* \* \*